106. COMPOSITIONS, COATING OR PLASTIC.

76

1,395,874

UNITED STATES PATENT OFFICE.

WILBUR F. STERLING AND VICTOR E. GROTLISCH, OF WASHINGTON, DISTRICT OF COLUMBIA, AND FLETCHER P. VEITCH, OF COLLEGE PARK, MARYLAND.

METHOD FOR MAKING VARNISH MATERIALS.

1,395,874.      Specification of Letters Patent.      Patented Nov. 1, 1921.

No Drawing.      Application filed September 15, 1921. Serial No. 500,984.

(FILED UNDER THE ACT OF MARCH 3, 1883, 22 STAT. L., 625.)

*To all whom it may concern:*

Be it known that we, WILBUR F. STERLING, VICTOR E. GROTLISCH, and FLETCHER P. VEITCH, citizens of the United States, and employees of the United States Department of Agriculture, the first two being residents of Washington, District of Columbia, and the latter a resident of College Park, Maryland, whose post-office address is Department of Agriculture, Washington, District of Columbia, have invented certain new and useful Methods for Making Varnish Materials.

This application is made under act of March 3, 1883, chapter 143 (22 Stat., 625), and the invention herein described and claimed may be used by the Government of the United States, its officers and employees and by any person in the United States without payment to us of any royalty. We hereby dedicate the same to the free use of the Government and the people of the United States.

This invention relates to the use of certain catalysts in methods of making varnish resin materials and the like, including resin esters, whereby esters, anhydrids, lactones and the like, in some cases of almost complete neutrality, can be prepared, and the present well known process thereby simplified.

When grinding, or mixing a pigmented varnish in which resins, containing a large amount of acid material, form one of the constituents, the acid resins combine with the basic pigments such as the metallic oxids, and cause "livering" or thickening of the product, thereby rendering it unfit for use.

This difficulty can be partially overcome by neutralizing the acid resins with lime. However, if they are neutralized to a sufficient degree to avoid "livering", the neutralized products are insoluble in the varnish maker's solvents. By esterifying the acid resins with glycerin or other organic hydroxy bodies, esters of various degrees of neutrality can be formed, which do not "liver" with basic pigments. The usual practice is to heat together at a suitable temperature resin and glycerin under various conditions of pressure, *in vacuo* or in an atmosphere of an inert gas. Considerable trouble and time are required in this way to produce esters of sufficient neutrality.

By our invention it is possible to shorten the time required for union of the resin and hydroxy body considerably, and to produce at will resin esters with an acid number of less than 2, or of any other number.

When rosin is heated in the neighborhood of 300° C., considerable anhydrid material is formed. This anhydrid is not quantitatively determined by aqueous potash, so it is necessary to titrate with alcoholic potash in determining acid numbers. This gives the total acidity.

Besides rosin, other acid resins may be esterified, such as various copals, shellac, dammar, etc.

Rosin will be used to illustrate the advantages of the present invention. 150 parts rosin, 20 parts glycerin, and 0.5 parts finely divided zinc were heated in an acid resistant container fitted with an air reflux condenser, between 275° C.—280° C. for ½ hour. The condenser was then removed and the temperature raised to 310° C. to drive off any excess glycerin. By this process a product having an acid number of 0.9 was obtained. Several duplicate experiments gave acid numbers in each case less than 1.5. Equivalent amounts of zinc oxid, and zinc carbonate gave similar results.

450 parts rosin and 60 parts glycerin were heated in a zinc lined container, fitted with an air reflux condenser, between 275° C.—280° C. for ½ hour. The condenser was then removed and the temperature raised to 310° C. and the mass allowed to cool to 160° C. out of contact with the air. The acid number was 1.2.

When the experiment was carried out under similar conditions, but not in the presence of zinc or zinc compounds, it was necessary to heat the mixture for 2 hours to obtain a product of similar acid number. It is evident that zinc and zinc compounds greatly accelerate the reaction and enable it to go to completion in much less time than otherwise.

When the process is carried out in the presence of finely divided zinc, or in a zinc lined container, the zinc is affected to only a very slight degree by the molten resin, as shown by the fact that only about 0.2% of zinc is taken up by the esterified resin.

When zinc oxid or carbonate is used in place of zinc, these are entirely absorbed by the resin. This may be advantageous by increasing slightly the hardness of the final product.

Rosin and many other resins, when heated over 200° C., in contact with the air darken rapidly. This is caused almost entirely by oxidation. The longer molten resin is exposed to the atmosphere the darker it becomes. During the reaction between resins and glycerin, water vapor and other vapors are given off and retained in the reaction chamber by means of a reflux condenser. These vapors displace the air and keep the oxygen of the air away from the product, thus retarding the darkening. In every case where zinc or zinc compounds were used the product was much lighter in color than resins formed under similar conditions without the use of zinc or zinc compounds. This is probably due to the fact that by the use of zinc, etc., the reaction is more rapid and consequently there are more vapors given off per unit time in the chamber than otherwise, and the mass is in a molten condition, only about ¼ of the usual time. Therefore, resin esters produced by the aid of zinc of zinc compounds are superior in color to those produced without the use of these catalytic bodies.

The presence of zinc or zinc compounds was found to be beneficial when the process of esterification of resin and glycerin was conducted *in vacuo* or in an atmosphere of an inert gas. In both cases the reaction was greatly accelerated and the resulting product was practically neutral.

By proper regulation of the time of heating, or the temperature if desirable, or both, resin esters of any desired degree of neutrality or acidity can be produced. The resin esters produced in the manner described above, may be incorporated with the usual varnish oils such as linseed oil, China wood oil, etc. Driers may be added, and the mass thinned to the proper consistency with turpentine or any other varnish thinner. They may be used with basic pigments without danger of "livering," or in cases where acidity is not a factor, may be mixed with acid resins.

If, as is sometimes desirable or advantageous, it is necessary to esterify a mixture of acid resins with glycerin or other similar hydroxy body, the same may be accomplished more readily and easily by the use of zinc or zinc compounds as catalysts.

We claim:

1. The method of making a varnish material consisting in heating together resin and glycerin in the presence of metallic zinc.

2. The method of making a varnish material consisting in heating together resin and glycerin in a zinc container.

3. The method of making a varnish material consisting in heating together resin and glycerin in a zinc lined container.

4. The method of making a varnish material consisting in heating together in any suitable container resin and glycerin in the presence of zinc compound.

5. The process of making a varnish ester gum, which comprises esterifying resin with glycerin in the presence of zinc.

6. The process of making a varnish ester gum, which comprises esterifying resin with glycerin in the presence of zinc compound.

WILBUR F. STERLING.
VICTOR E. GROTLISCH.
FLETCHER P. VEITCH.

Witnesses:
E. O. REED,
W. F. ROONEY.